United States Patent Office 2,736,666
Patented Feb. 28, 1956

2,736,666

GELLED COMPOSITIONS AND METHOD FOR MAKING THE SAME

Harry H. Beacham, Plainfield, N. J., assignor to National Lead Company, New York, N. Y., a corporation of New Jersey No Drawing. Application June 8, 1951,
Serial No. 230,703

9 Claims. (Cl. 106—244)

This invention relates to gelled compositions and methods for making the same. More specifically it relates to gelled compositions prepared from oils.

Gelled compositions prepared from oils, particularly linseed oil, have been prepared by various methods. Among such methods is that of blowing the oil with air at elevated temperatures for considerably long periods of time to produce a gel. This type of gel is used in the manufacture of linoleum. Such gelled compositions may be prepared by blowing tri-glyceride oils having an iodine number of at least 150 at elevated temperature for long periods of time. Such oils are usually referred to as drying oils. They include linseed, chinawood, dehydrated castor, menhaden and oiticica. Such a procedure usually takes at least 16 hours to produce the gelled compositions from such oils. Many attempts have been made to prepare gelled compositions from tri-glyceride oils of the semi-drying type by such a process but the nature of the oils normally prevents the formation of satisfactory gelled compositions by such methods unless they are modified or processed for excessive periods of time. Oils which fall within the semi-drying type include soya, safflower, castor. They mostly have iodine numbers which fall between 80 and 150. It would be particularly desirable to produce gelled compositions from oils of the semi-drying type if possible because of the economic considerations in the raw material used. Many oils of the semi-drying type are cheaper than those of the drying oils. However, since the semi-drying oils are not readily adaptable for forming gelled compositions, oils of the drying type are normally employed.

An object of this invention therefore is to provide a method for producing gelled compositions. A further object is to provide a rapid method for the preparation of such gelled compositions which is economical and simple to employ. A further object is to provide a method in which triglyceride oils, both the drying oils and semi-drying oils may be formed into gelled compositions. These and other objects will become apparent from the following more complete description of the instant invention.

In its broadest aspects this invention contemplates preparation of a gelled composition which comprises oxidizing a triglyceride oil having an iodine number of at least 80 until the viscosity of the oxidized oil is from 15 to 150 poises and admixing said oxidized oil with a titanium ester whereby said composition is formed substantially, immediately upon said admixture. In forming a gel of the oxidized oil by the process of this invention, a titanium ester is admixed with the oxidized oil and the gel is formed substantially, immediately upon such mixing. No extended period of time is required to form the gel. Substantially any general temperature may be employed, and normally room temperature is used.

This invention further contemplates a gelled composition comprising an oxidized triglyceride oil and a titanium ester.

In preparing such compositions it is particularly desirable to employ titanium esters which includes both titanium orthoesters and alkoxy titanium acylates. Titanium orthoesters may be prepared by various methods described in the literature. It has been found that particularly satisfactory results are obtained when alkyl titanates prepared from alcohols containing from 2 to 22 carbon atoms in the alcohol group are employed. The alkoxy titanium acylates may be prepared according to the method described in copending application Serial No. 198,223 filed November 29, 1950. In such compounds, it is preferred that the alkoxy group contain from 2 to 22 carbon atoms and the acylate should be derived preferably from organic acids selected from the group consisting of alkanoic and alkenoic carboxylic acid containing no more than 2 carboxylic groups, said acylate group containing from 3 to 30 carbon atoms. The alkoxy titanium acylate preferably should also contain from 1 to 3 alkoxy groups per titanium atom, and contain from 1 to 3 carboxyl groups per titanium atom, and the sum of the alkoxy and carboxyl groups should be substantially equal to 4 per titanium atom. It has been found that both types of titanium esters described above may be employed with substantially identical results.

Substantially any type of triglyceride oil having an iodine number of at least 80 may be employed in the preparation of the gelled compositions contemplated by the instant invention. Among the oils which are most commonly employed according to the instant invention are linseed, chinawood, dehydrated castor and oiticica oil (drying oils), and soya and safflower, castor and menhaden oils (semi-drying oils).

As previously stated, normally only those of the drying type oils have been used to form such gelled compositions. However, by the process of this invention both the drying and semi-drying oils may be used with substantially identical results obtained. As in the process of the instant invention, the oils are oxidized, normally by blowing with air at elevated temperature for a period of a few hours to increase the viscosity. It has been found that the oils should be oxidized until a viscosity of at least 15 poises is obtained before the titanium ester is admixed with the oxidized oil. If the viscosity of the oil is less than 15 poises upon admixing with the titanium ester, the result and the composition is rather fluid instead of possessing plastic characteristics which are desired by compositions contemplated by the instant invention. For economic reasons and because of the difficulties in handling viscous masses, it is preferred that the viscosity of the blown oil does not exceed 150 poises before the titanium ester is admixed with the blown oil. Viscosities above 150 poises are not desired because of the difficulty in handling and employing such viscous masses.

The amount of titanium ester which is admixed with the blown oil may vary considerably and it has been found that satisfactory gels have been formed when about 2% to about 10% titanium ester is added to the blown oil. If the titanium ester is added in amounts substantially less than 2%, the mixture does not form the type of gel which is desirable. Instead of possessing the desired rigid and plastic characteristics, it possesses fluid characteristics which are undesirable. When the titanium ester is added in amounts substantially above 10%, the gelled composition appears to be too dry and powdery and possesses other undesirable characteristics. When the titanium ester falls within the range of about 2% to about 10%, a rigid and plastic gel-like composition is formed. Such a composition is readily and economically prepared and is useful as a carrier or catalyst in organic synthesis in the chemical field and is particularly useful as a gelled composition in the manufacture of linoleum.

In the manufacture of linoleum normally it was necessary prior to this invention to employ oils of the drying type, that is, particularly linseed oil. In such manufacture the oil is blown at elevated temperatures for an extended period, i. e. about 16 hours, in order to produce the gelled composition. The gelled composition is admixed with a filler pressed into sheets and cured by heating to form linoleum. Oils of the semi-drying type normally do not form gels upon blowing without modifying such oils and therefore they are not usually employed. In the manufacture of linoleum the time required to form the gel may be considerably reduced by forming the gelled compositions according to the process of the instant invention. In order to more fully illustrate the instant invention, the following examples are presented.

*Example 1*

A portion of linseed oil was oxidized by heating at 250° Fahrenheit and blowing with air for 8 hours at the elevated temperature. After the oxidizing treatment the oil had a viscosity of 36 poises.

380 parts of the blown linseed oil were mixed in a vessel with 20 parts of butyl titanate. The oil gelled almost immediately and was converted to a tacky, gummy mass resembling linoxin.

In order to prepare a linoleum from this gelled composition 375 parts of this gelled oil were blended with 107 parts of titanium dioxide, 234 parts of calcium carbonate whiting, and 348 parts of wood flour. After thorough blending the mixture was pressed into a sheet on a two roll linoleum mill. The sheet was smooth, homogeneous and sufficiently tough for convenient handling. This sheet was placed in an oven and cured for 48 hours at 220° F. The cured sheet was high quality linoleum having strength and abrasion resistance comparable to the usual linoleum commercial products.

*Example 2*

A gelled composition was prepared from safflower oil. In order to prepare this composition, safflower oil was first oxidized by heating at 250° Fahrenheit and blown with air for 16 hours at the elevated temperature. The oxidized oil had a viscosity of approximately 100 poises. A gelled composition was prepared from the blown oil by mixing 380 parts of the blown oil with 20 parts of amyl titanate. The gelled composition formed almost immediately upon the mixing.

A linoleum was prepared by using the procedure described in Example 1 and employing the gelled composition produced by this example. The linoleum produced had substantially identical properties to that described in Example 1.

*Example 3*

The procedure of Example 1 was again repeated except that the starting oil was a blown soya oil having a viscosity of approximately 100 poises. The gelled composition formed a plastic mass resembling linoxin and had similar characteristics to the gelled composition produced in Example 1.

A linoleum was prepared from this composition and had substantially identical properties with those described in Example 1.

*Example 4*

The procedure of Example 1 was repeated using 364 parts of the same blown linseed oil and 16 parts of tributoxytitanium monolinoleate. The gelled composition was used for the preparation of linoleum and the linoleum produced had properties similar to those described in Example 1.

From the above description and by the examples shown, it has been clearly shown that gelled compositions may be prepared by a rapid and economical process.

It has further been shown that an oxidized triglyceride oil may be gelled substantially immediately by admixing said oil with a small amount of titanium ester. By such a process the blown oil is gelled immediately without resorting to the normally extended period of time which is usually employed.

It has further been shown that the oil may be gelled at substantially room temperatures. Such gelled compositions may be readily formed and may be prepared by a procedure which considerably reduces the time required to form such compositions. By the instant invention, gelled compositions may be produced from most any triglyceride oil which has an iodine number of at least 80.

While this invention has been described and illustrated by the examples shown, it is not intended to be strictly limited thereto and other modifications and variations may be employed within the scope of the following claims.

I claim:

1. Preparation of a gelled composition which comprises oxidizing a triglyceride oil having an iodine number of at least 80 until the viscosity of the oxidized oil is from 15 to 150 poises and admixing said oxidized oil with a titanium ester in amount from about 2% to about 10%, said ester being selected from the group consisting of titanium orthoester and alkoxy titanium acylate wherein the sum of the alkoxy and carboxyl groups is substantially 4 per titanium atom, said orthoester being prepared by reacting a titanium compound with a monohydric saturated alcohol containing from 2 to 22 carbon atoms, said alkoxy group in said alkoxy titanium acylate containing from 2 to 22 carbon atoms, and said acylate group in said alkoxy titanium acylate containing from 3 to 30 carbon atoms, whereby said composition is formed substantially immediately upon admixture.

2. Preparation according to claim 1 in which said oil is oxidized by blowing with air.

3. Preparation according to claim 1 in which said oil is linseed oil.

4. Preparation according to claim 1 in which said oil is soya oil.

5. Preparation according to claim 1 in which said oil is safflower oil.

6. Preparation according to claim 1 in which said oil is castor oil.

7. Preparation according to claim 1 in which said oil is menhaden oil.

8. Composition according to claim 1 in which the titanium ester is an alkyl titanate.

9. Composition according to claim 1 in which the titanium ester is alkoxy titanium acylate.

References Cited in the file of this patent

UNITED STATES PATENTS 2,620,318    Boyd et al.    Dec. 2, 1952

FOREIGN PATENTS 386,715    Great Britain    1933
125,450    Australia    Sept. 25, 1947

OTHER REFERENCES

Kraitzer et al.: J. Oil & Colour Chemist's Association, vol. 31, No. 340, 1948, pages 411–412.